March 25, 1930.  C. L. KLINE  1,752,007

ATTACHMENT FOR GAS HEATERS

Filed July 21, 1928

Inventor,
Charles L. Kline,
by Walter P. Geyer
Attorney.

Patented Mar. 25, 1930

1,752,007

UNITED STATES PATENT OFFICE

CHARLES L. KLINE, OF BUFFALO, NEW YORK, ASSIGNOR TO HENRY B. HARRINGTON, OF BUFFALO, NEW YORK

ATTACHMENT FOR GAS HEATERS

Application filed July 21, 1928. Serial No. 294,387.

This invention relates generally to an attachment for gas-burning heaters, stoves and the like, but more particularly to a carbon monoxide gas eliminator therefor.

Its chief object is the provision of a simple and efficient apparatus for decomposing and eliminating the deadly carbon monoxide gas which usually escapes from domestic heaters.

Another object of the invention is to provide a device of this character which can be readily applied to heaters of various types and which can be manufactured at a moderate cost.

In the accompanying drawings:—

Figure 1:
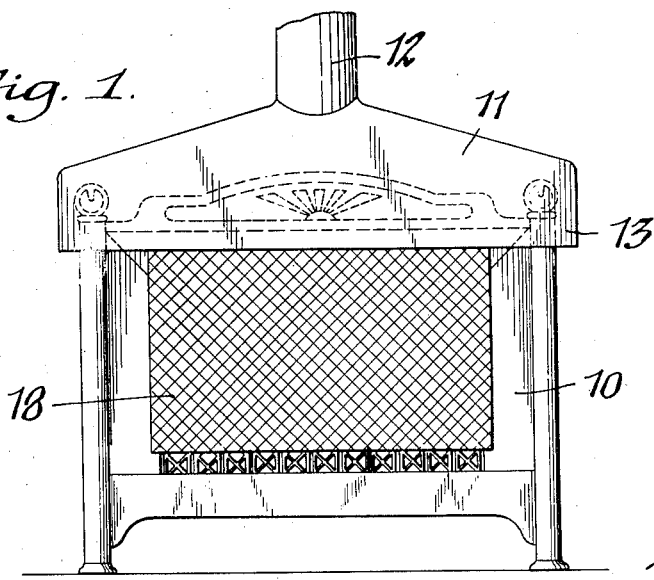
Figure 2:
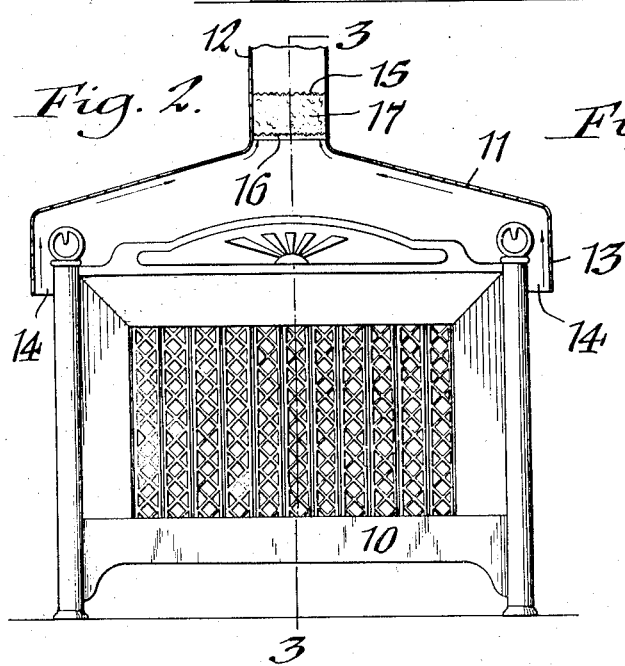
Figure 3:
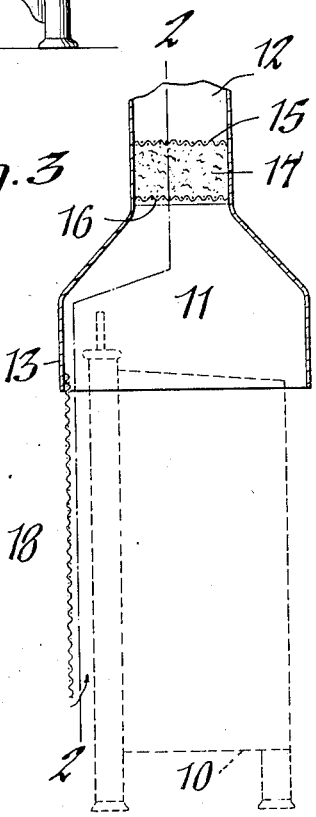

Figure 1 is a front view of a domestic gas heater showing my invention in connection therewith. Figure 2 is a vertical section on line 2—2, Figure 3. Figure 3 is a transverse section on line 3—3, Figure 2.

Similar characters of reference indicate corresponding parts throughout the several views.

While my invention is applicable to various heating devices from which toxic carbon monoxide gas escapes, it has been shown by way of example, as applied to a domestic, radiant type gas heater 10 of ordinary construction. Fitted over the upper end of the heater to receive the products of combustion issuing from the burners thereof is a compartment or hood 11 preferably made of catalytic material, such as copper, and rising from the upper central portion of the same is an outlet pipe or flue 12 for the passage of the products of combustion either into the room in which the heater is located or into the chimney. This hood has a depending rim or skirt 13 which is spaced a suitable distance from the upper portions of the heater-walls to provide an inlet passage 14 through which the air from the room is adapted to circulate and commingle with the hot air and products of combustion thrown off into the hood before escaping through the flue 12.

Arranged in the lower end of the flue 12 adjacent its junction with the hood 11 and between vertically spaced screens 15, 16, of copper or other catalytic material, is a mixture of glass wool and hopcalite, indicated at 17, through which the products of combustion from the heater must circulate before being discharged from the flue. The hopcalite, which is a granular product composed of copper oxide and manganese dioxide, acts as a catalyst and causes any carbon monoxide present in the escaping gases to combine with the oxygen drawn through the air passage 14 and form the relatively harmless carbon dioxide. If desired, a layer of fused calcium chloride may be used in advance of the hopcalite for the purpose of absorbing any water vapor present in the escaping gases. The glass wool serves as a medium to hold the powder-like hopcalite in suspension.

Extending over the front side of the heater and attached at its upper end to the hood-rim 13 is a catalytic apron or screen 18, also made of copper, which acts to intercept any carbon monoxide projected forwardly from the heater and in the presence of the oxygen of the air traveling upwardly between the screen and the heater to unite therewith and form carbon dioxide.

By this improved attachment, the products of combustion emanating from the top or front side of the heater are brought into intimate contact with catalyzing agents, which, in the presence of the oxygen of the air drawn into the hood 11 and into the space between the heater and the screen 18, effectively promote a union of the carbon monoxide and oxygen to form the relatively harmless carbon dioxide gas, thereby eliminating the present objections and dangers of gas heaters and similar heating apparatus in homes.

I claim as my invention:—

1. An attachment for eliminating carbon monoxide and other poisonous gases emitted from a heating apparatus, comprising a hood adapted to be placed over the same and having an air intake and a discharge passage, spaced screens arranged in said passage, and a catalyzing agent disposed in the passage between said screens.

2. An attachment for eliminating carbon monoxide and other poisonous gases emitted from a heating apparatus, comprising a hood adapted to be placed over the same and having an air intake, a flue leading from the hood and through which the products of combustion from the heating apparatus are discharged, screens of catalytic material arranged in spaced relation within the flue, and a charge of hopcalite contained in the flue between said screens.

3. An attachment for eliminating carbon monoxide from an upright gas heating apparatus, comprising a hood adapted to be placed over the same, and a screen, of catalytic material depending from said hood and adapted to extend across the burner elements of said apparatus.

4. A carbon monoxide eleminator for gas heaters, comprising a hood containing an outlet adapted to be placed over the heater in spaced relation thereto to provide an air intake passage, a screen of catalytic material depending from said hood to assume a position in front of the burner elements of the heater, screens of catalytic material arranged in spaced relation in the hood-outlet, and a charge of hopcalite contained between said screens.

5. An attachment for eliminating carbon monoxide and other poisonous gases from flueless gas heaters, comprising a chambered member adapted to be arranged over the upper part of the heater to receive the products of combustion emanating therefrom, said member having an air intake and the chamber thereof containing a catalyzing agent.

6. A device for eliminating carbon monoxide and other poisonous gases issuing from gas heating appliances, comprising an attachment applied to the heater and including a chamber into which the products of combustion issuing from the heater are discharged, said chamber having an air inlet and containing a catalyst, the latter and the oxygen of the air acting to reduce the poisonous gases contained in the products of combustion to non-poisonous gases.

7. In a gas heater of the character described, the combination of a chambered member applied to the heater in spaced relation thereto to provide an air intake passage, and a catalyzing agent contained in the chamber of said member and with which the products of combustion and the oxygen of the air admitted through said passage are adapted to intimately contact.

CHARLES L. KLINE.